Sept. 26, 1944. H. D. GEYER 2,359,104
CLUTCH
Filed June 8, 1942

Inventor
Harvey D. Geyer
By Blackmore, Smeeus & Flint
Attorney

Patented Sept. 26, 1944

2,359,104

UNITED STATES PATENT OFFICE 2,359,104

CLUTCH

Harvey D. Geyer, Dayton, Ohio, assignor to General Motors Corporation, Detroit, Mich., a corporation of Delaware Application June 8, 1942, Serial No. 446,217

3 Claims. (Cl. 192—68)

This invention relates to friction clutches such as are used to couple the engine and transmission shafts of motor vehicles.

The object of the invention is to provide axial cushioning to prevent jerky movements as the clutch members frictionally engage.

A further object is to provide axial cushioning which shall be independent of the driven clutch member.

As a further object the invention is to be carried out by the use of axially yielding means as a part of the assembly which receives the reaction of the clutch engaging spring.

Other objects include efficiency in operation, convenience in assembly and economy in manufacture and will be understood from the description which follows.

Figures 1, 2:
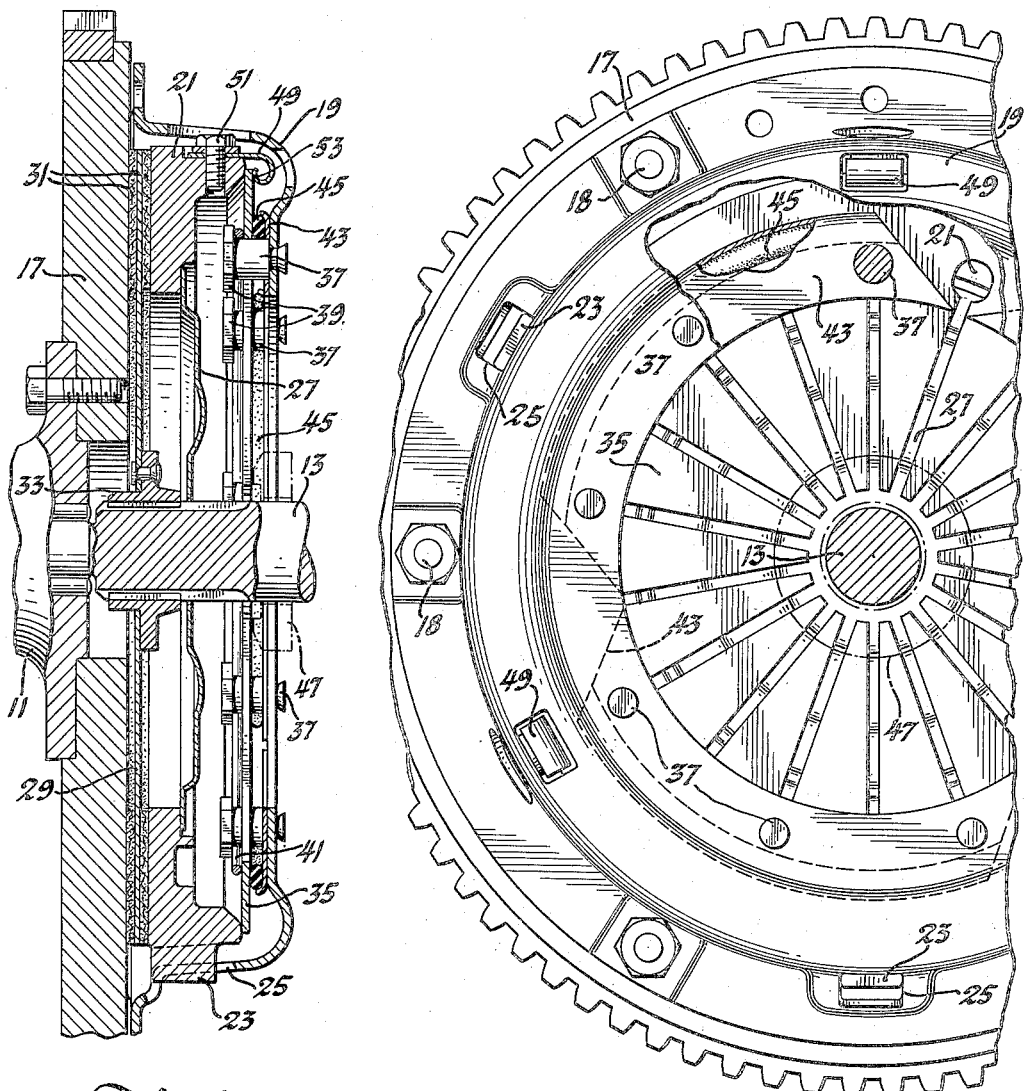
Fig. 1 is a transverse section through a clutch of generally conventional form but modified to include the subject matter of this invention.
Fig. 2 is a view in elevation.

The clutch as shown is intended primarily, although not exclusively, for coupling an engine shaft such as 11 to a transmission shaft marked 13. It includes a flywheel 17, to which is secured at 18 a cover 19. Within the cover is a pressure plate 21 having lugs 23 slidable in elongated openings 25 of the cover. The pressure plate may therefore slide axially relative to the flywheel and rotation of the flywheel is transmitted to the pressure plate. The pressure plate may carry an oil baffle 27. The driven plate is marked 29. It has facings 31 on opposite sides of its outer margin. It is carried by a hub 33 slidably splined to the driven shaft. A normally bowed disc spring 35 peripherally engages the edge of the pressure plate. The spring has openings to receive fulcrum pins 37 which pins are carried by the cover and support the spring. These pins have heads 39 and between the heads and the spring is a ring 41.

In prior constructions a ring like 41 has been positioned on the other side of the spring between the spring and the cover. In the present invention I am using a plurality of arcuate plates 43 to which are molded arcuate cushioning members 45 which are of elastic, incompressible, deformable material such as soft rubber or the like. Three plates 43 with cushions 45 are shown mounted on the pins. It will be understood that there may be a greater or lesser number. In fact a single ring may replace the plurality of parts. In any case the assembly is mounted on the pins with the rubber engaging the spring. The spring 35 is of such shape that it is stressed when in operation, exerting pressure on the pressure plate to grip the driven plate between itself and the flywheel. The rubber cushion takes the reaction. When the clutch is to be released suitable throwout means 47 pushes forward upon the central part of spring 35 and takes the reaction load from the rubber ring. Also the outer end of the spring no longer exerts pressure on the pressure plate. The ring 41 acts as a sort of fulcrum and the outer margin of the spring moves away from the flywheel. To positively disengage the pressure plate there may be used yielding members 49 attached to the pressure plate at 51 having ends overlying the marginal edge of the spring at 53.

In the act of clutch engagement the reaction is again taken by the rubber ring. Since this reaction member is yieldable instead of rigid, as in prior constructions where a second metal ring was used, the yielding reaction is equivalent to a less abrupt application of spring force to the pressure plate so that a more gradual clutch engagement occurs.

It is believed that this expedient may make it unnecessary to resort to the commonly employed distorted formations of the driven plate intended to effect just such axial cushioning, which formations have been not altogether satisfactory.

I claim:

1. In a clutch including friction engaging members, bowed disc spring means operable to press said members together, means to take the reaction of said spring means, said last named means including a ring of elastic, incompressible, deformable material in contact with said spring along a circular line of contact radially spaced from the line of contact of said spring and friction members.

2. In a clutch including friction engaging members, bowed disc spring means operable to press said members together, means to take the reaction of said spring means, said last named means including a ring of elastic, incompressible, deformable material in contact with said spring along a circular line of contact radially spaced from the line of contact of said spring and friction members, said clutch having a cover and said ring comprising a plurality of arcuate sections and an arcuate metal strip bonded to each section and in contact with said cover.

3. In a clutch for vehicles, a flywheel, a cover secured thereto, a pressure plate within said cover and slidable axially relative thereto but non-rotatable relative to the cover, a driven plate adapted to be gripped between the pressure plate and flywheel, said cover having a circular series of pins, a bowed disc spring mounted on said pins and engaging said pressure plate and cushioning means supported on said pins between the spring and cover, said cushioning means adapted to take the reaction of the spring load and comprising arcuate plate means supported by said pins and arcuate deformable means bonded to said arcuate plate means, the deformable material positioned in contact with said spring.

HARVEY D. GEYER.